(12) United States Patent
Swain

(10) Patent No.: US 7,017,880 B2
(45) Date of Patent: Mar. 28, 2006

(54) DUAL FUNCTION MIRROR MOUNT

(75) Inventor: Daniel M. Swain, Southgate, MI (US)

(73) Assignee: Mirror Lite, Rockwood, MI (US)

( * ) Notice: Subject to any disclaimer, the term of this patent is extended or adjusted under 35 U.S.C. 154(b) by 0 days.

(21) Appl. No.: 10/054,650

(22) Filed: Oct. 19, 2001

(65) Prior Publication Data
US 2002/0113189 A1 Aug. 22, 2002

Related U.S. Application Data

(60) Provisional application No. 60/241,772, filed on Oct. 19, 2000.

(51) Int. Cl.
  B60R 1/00 (2006.01)
(52) U.S. Cl. ............ 248/475.1; 248/487; 248/476
(58) Field of Classification Search ............ 248/481, 248/476, 484, 480, 475.1, 479, 276.1, 282.1, 248/284.1, 288.31
See application file for complete search history.

(56) References Cited

U.S. PATENT DOCUMENTS

| 1,938,541 | A | * | 12/1933 | Oishei | 45/97 |
| 2,256,763 | A | * | 9/1941 | Reed | 248/276 |
| 3,976,275 | A | * | 8/1976 | Clark | 248/487 |
| 4,166,651 | A | * | 9/1979 | Vandenbrink | 296/84 B |
| 4,281,815 | A | * | 8/1981 | O'Connell et al. | 248/479 |
| 4,500,063 | A | | 2/1985 | Schmidt et al. | 248/475.1 |
| 5,116,013 | A | | 5/1992 | Malcolmson | 248/484 |
| 5,227,924 | A | * | 7/1993 | Kerper | 359/875 |
| 5,316,257 | A | * | 5/1994 | Schmidt et al. | 248/487 |
| 5,483,385 | A | * | 1/1996 | Boddy | 359/841 |
| 5,513,048 | A | * | 4/1996 | Chen | 359/881 |
| 5,546,239 | A | * | 8/1996 | Lewis | 359/855 |
| 5,623,374 | A | * | 4/1997 | Montanbault | 359/841 |
| 6,371,345 | B1 | * | 4/2002 | Leyden et al. | 224/553 |

* cited by examiner

Primary Examiner—Ramón O. Ramirez
Assistant Examiner—Steven Marsh
(74) Attorney, Agent, or Firm—John A. Artz; Artz & Artz, P.C.

(57) ABSTRACT

A rear view mirror assembly includes a mirror head tightly but turnably clamped to the distal end of a pole or staff mounted onto the fender of a large truck or bus. The mirror head has disposed within an interior chamber thereof socket means that form either a longitudinal bore to clampingly receive the distal end of the pole and permit rotational motion of the mirror head relative to the longitudinal axis of the pole or a ball socket for seating the ball portion of a ball socket member connected to the distal end of the pole and permit swivel motion of the mirror head relative to the longitudal axis of the pole. Tightening means, exterior in part to the interior chamber, move from a first position wherein the mirror head may turn relative to the pole and into a second position to orient the mirror head into a desired position and fixedly clamp the mirror head in that position.

20 Claims, 3 Drawing Sheets

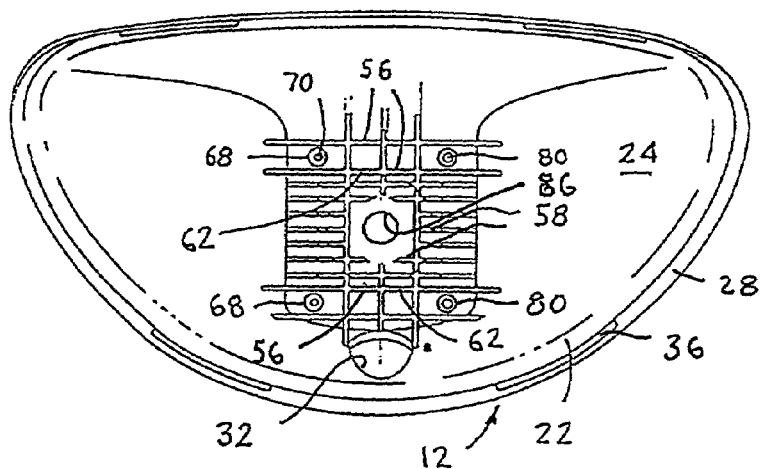
FIG. 3
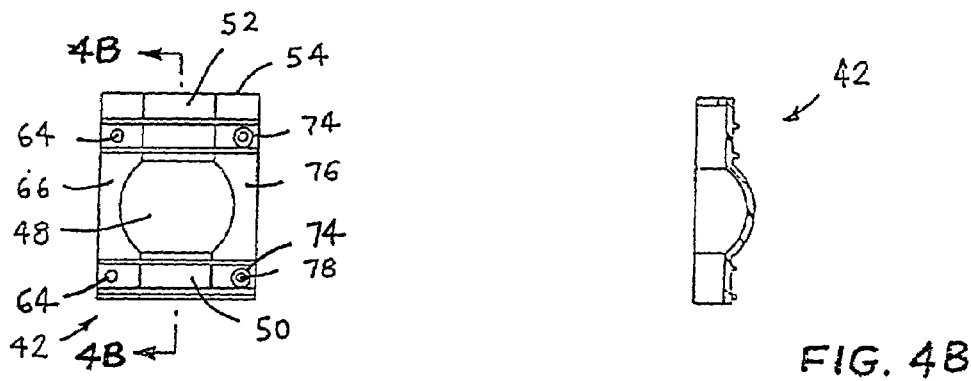
FIG 4A
FIG. 4B
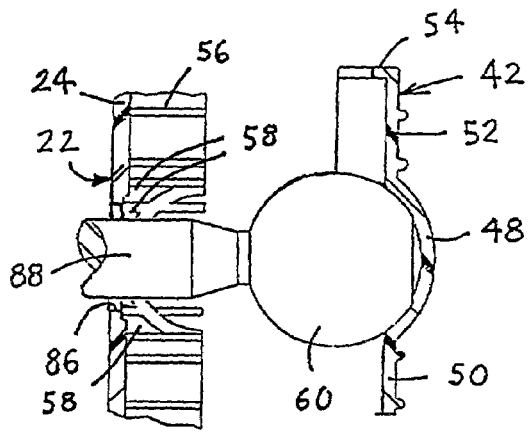
FIG. 6

DUAL FUNCTION MIRROR MOUNT

CROSS-REFERENCE TO RELATED APPLICATIONS

This application is a completion application of U.S. Provisional Patent Application Ser. No.: 60/241,772, filed Oct. 19, 2000, and entitled, "DUAL FUNCTION MIRROR MOUNT", the disclosure of which is hereby incorporated by reference.

BACKGROUND OF THE INVENTION

The present invention generally relates to a rear view mirror assembly mounted to the distal end portion of a pole or staff mounted on the fender or mirror arm of a large truck or bus and more particularly to an arrangement for tightly clamping yet turnably positioning the mirror into a desired position relative to the end portion of the pole.

Motor vehicles, and in particular larger vehicles such as buses, trucks and the like, typically mount one end of the pole to the body of the vehicle and attach a mirror element to other end of the vehicle mounting pole. This arrangement has worked well to support a mirror or the like out away from the vehicle to provide improved visibility of the blind spots of the vehicle.

U.S. Pat. No. 4,500,063, issued Feb. 19, 1985 to Schmidt et al., the disclosure of which is hereby incorporated by reference, typifies a mirror mounting assembly of this type. In one aspect, Schmidt et al. discloses a mounting arrangement wherein a base member and a cover member are secured together to form an aperture into which a lower leg of the support bracket is inserted and retained. Transverse ribs in the cover member grip the support bracket as the cover member is secured to the base member. Schmidt et al. teaches that threaded fasteners be used to secure the mirror to the free end of the support bracket.

U.S. Pat. No. 5,316,257, issued May 31, 1994 to Schmidt et al., the disclosure of which is hereby incorporated by reference, discloses a vehicle mounting assembly wherein the cover and base members are provided on the back of the mirror and captivate the end portion of the support bracket thereby to permit rotation of the mirror about a longitudinal axis.

Similarly, in U.S. Pat. No. 5,116,013, issued May 26, 1992 to Malcolmson, the disclosure of which is hereby incorporated by reference, there is taught a ball stud mount.

From the prior art it is apparent that the art has taught either a clamping or ball stud mount for securing the mirror head to the shaft.

It would be desirable to provide an improved mirror mount that would enable the user to tightenably adjustably secure a mirror head assembly either directly to the mounting end of the support bracket or to a ball socket type mount which is connected to the support bracket.

SUMMARY OF THE INVENTION

The general object of the present invention is the provision of an improved rear view mirror assembly connectable to a vehicle, the assembly comprising: a mirror head for mounting the mirror and attachable to the end portion of a support bracket spaced from the end portion of a vehicle support, the mirror head being formed as an integrally molded plastic piece and having an interior surface defining an interior chamber and a periphery shaped to receive the mirror, and securing means for securing the mirror head tightly yet turnably to the end portion of the support. In particular, the securing means comprises:

socket mans interiorly of the chamber and defining a socket for receiving the end portion, the socket means comprising an endwall facing inwardly of the interior chamber, the endwall having an opening communicating with the socket, a clamping plate, the endwall and the clamping plate being configured to form the socket for captivating the end portion and constraining the mirror head to turn about an axis through the socket, and tightening means at least in part exteriorly of the interior chamber for forcing the clamping plate and the endwall towards one another and against the end portion when the end portion is disposed in the socket whereby to prevent the mirror head from turning relative to the end portion.

The clamping plate is substantially rigid yet resilient and the tightening means comprises apertures being provided, respectively, in the clamping plate and the endwall, and a headed screw member having a head portion adapted to engage the exterior surface of the mirror head and a threaded portion sized to pass through apertures and into the interior passage and threadably engage the wall forming the aperture in the clamping plate.

The tightening means further comprises positioning means interiorly of said mounting head for positioning the clamping plate relative to the endwall, the positioning means including internally bored first and second bosses, respectively, being formed on the clamping plate and the endwall, and a threaded fastener having a head member to engage the clamping plate and a threaded portion sized to pass through the bore in the clamping plate and threadably engage the wall forming the bore in the endwall. Threadable engagement of the threaded fasteners forces the clamping plate towards the endwall and into engagement with the end portion therebetween.

According to a first preferred embodiment of this invention, the end portion comprises an elongated shaft, and the socket means comprises the clamping plate and the endwall each including a first sleeve portion and a second sleeve portion. In operation, the first sleeve portions and the second sleeve portions, respectively, are brought into register and cooperate to combine and form axially spaced first and second sleeves to receive the elongated shaft and define a longitudinal axis about which the mirror head rotates when the elongated shaft is disposed in the spaced sleeves.

According to a second preferred embodiment of this invention, the end portion comprises a ball fixedly connected thereto, and the socket means comprises the clamping plate and the endwall each including a ball seat portion. In operation, the ball seat portions are brought into register and cooperate to combine and form a ball socket for receiving the ball therewithin and in the ball can rotate to permit the angular position of the mirror head to change relative to the end portion.

The socket means comprises a plurality of ribs extending upwardly from the endwall and to upward end surfaces which cooperate to form a semicylindrical and a semispherical cradle. The upstanding ribs are generally flat, parallel to one another, and disposed adjacent to a respective opening in the endwall for receiving the end portion.

For a more complete understanding of the present invention, reference is made to the following detailed description and accompanying drawings. In the drawings like reference characters refer to like parts through the several views, in which:

BRIEF DESCRIPTION OF THE DRAWINGS

FIG. 3 is a plan view showing interior detail of the mirror head.

FIGS. 4A and 4B are plan and section views of a clamping plate according to this invention.

FIG. 6 is a section view, similar to FIG. 5, illustrating a second preferred embodiment according to this invention.

DETAILED DESCRIPTION OF THE PREFERRED EMBODIMENTS

Figure 1:
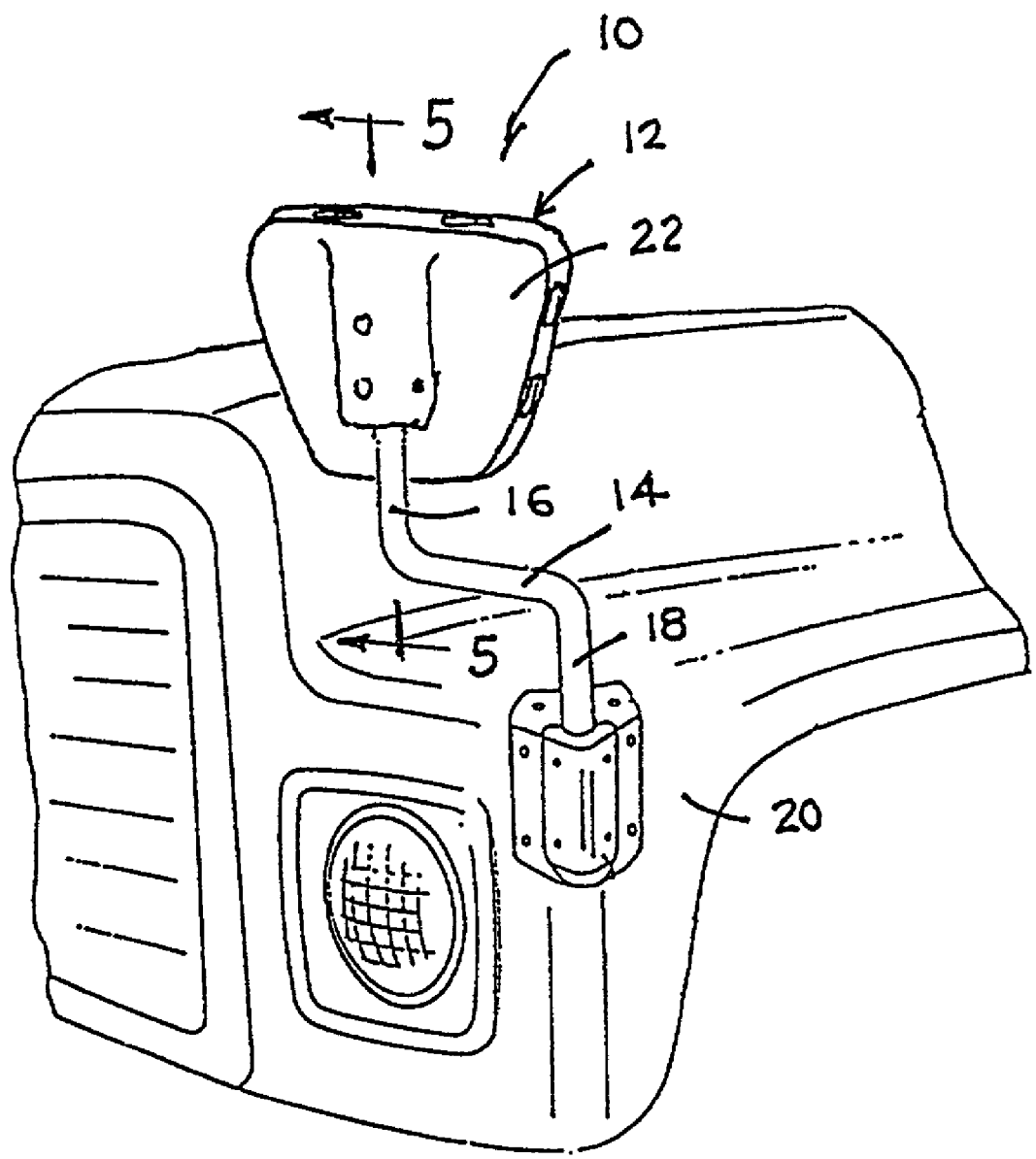
FIG. 1 is a perspective view of rear view mirror assembly, including a mirror head, mounted on the front fender of a vehicle, and illustrating a first preferred embodiment according to this invention.
Figure 2:
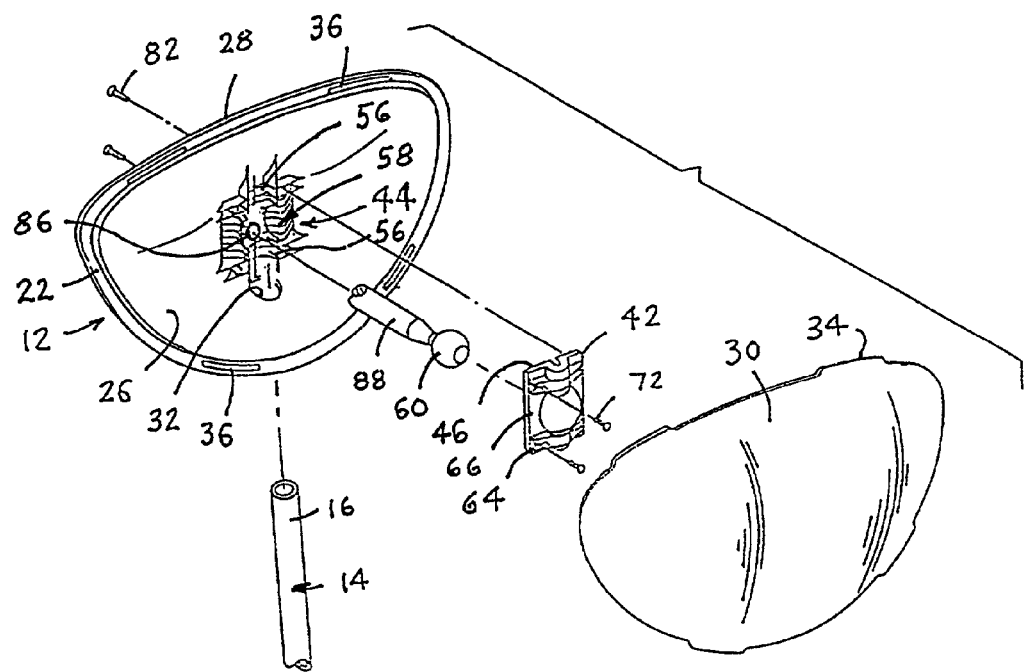
FIG. 2 is an exploded perspective view of the mirror head.
Figure 5:
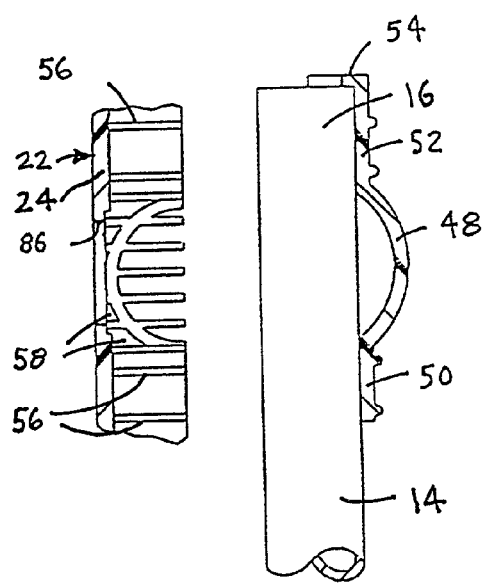
FIG. 5 is a section view taken along line 5—5 of FIG. 1 illustrating a first preferred embodiment according to this invention.

Referring now to the drawings, FIG. 1 illustrates a rear view mirror mount assembly 10 including a mirror mounting head 12, a mirror mount 14 having an upper end portion 16 connected to the mirror head and a lower end portion 18 connected to a fender 20 formed at the front end of a vehicle. Those skilled in the art will recognize that the vehicle may be a school bus, truck, van, automobile, or any other suitable coach work or chassis of a vehicle. As shown, the mirror mount comprises a tubular member. A suitable arrangement for mounting the lower end portion to the vehicle fender is disclosed in the above referenced U.S. Pat. No. 4,500,063 to Schmidt et al. and will not be discussed further.

It is to be understood that any fender mount may be used herein.

The mirror mounting head 12 is formed as an integrally molded plastic piece from a shaped wall 22 that includes an endwall 24 and defines an interior chamber 26 and an outer periphery 28 shaped to mate with a complementarily configured mirror 30. An opening 32 is formed in a lower portion of the shaped wall 22 for receiving the upper end portion 16 of the mirror mount 14, in a manner to be described herein. Preferably and in accordance with this invention there is provided on the outer periphery of the mirror 30 a plurality of fingers 34 each adapted to be snapped into like configured slots 36 formed in the outer periphery of the mirror mounting head 12 whereby to captivate the mirror to the mirror mounting head 12. When so mounted, the interior chamber 26 is substantially closed off.

In a first preferred embodiment, a socket is defined in the interior chamber for receiving and positioning a predetermined longitudinal length of the upper end portion 16. The socket is formed between a clamping plate 42 and a plurality of planar ribs 44 extending perpendicular to the endwall 24 and in spaced parallel relation. Preferably, the clamping plate 42 is molded of a resilient yet substantially rigid polymeric material such as plastic and includes a generally planar lower face 46, a central portion 48 forming a hemispherical cavity, and a pair of generally semi-cylindrical sleeve portions 50 and 52, the central portion 48 and sleeve portions 50 and 52 being formed in the lower face 46 of the clamping plate and the sleeve portions being aligned along a longitudinal axis. A flange 54 is formed in the clamping plate to form a stop at the end of the sleeve portion 52.

The ribs 44 include a plurality of first ribs 56 forming part of a substantially semi-cylindrical socket for receiving the end portion 16 and a plurality of second ribs 58 forming part of a complimentary substantially semi-spherical socket for receiving the ball 60 of a ball socket joint, as will be described in greater detail herein. Each of the first ribs 56 are spaced apart along a longitudinal axis and extend upwardly from the endwall 24 to generally semi-cylindrical end portions 62 to form, with the sleeve portions 50 and 52 in the clamping plate 42, a longitudinal socket for receiving the end portion 16. The sleeve portion 50 is positioned adjacent the opening 32 when the clamping plate is positioned in juxtaposition with the ribs 44, thereby permitting the end portion 16 to be axially inserted into the longitudinal socket a predetermined amount as defined by the stop flange 54.

For securing the clamping plate 42 to the endwall 24, a pair of first bores 64 are formed along one longitudinal edge 66 of the clamping plate and a pair of bosses 68 extend upwardly from the endwall 24, each boss 68 having a second bore 70 therethrough, the first bores 64 and second bores 70 being adapted to be brought into registry with one another. A threaded fastener 72 has a head and a threaded stem portion with the threaded stem portion being adapted to pass through an opening 64 to threadably engage with the bore 70 formed in the boss 68 and the head portion being adapted to engage the edge 66 of the clamping plate, thereby securing the clamping plate 42 to the mirror mounting head 12.

For tightening the clamping plate 42 to the endwall 24, a pair of bosses 74 extend upwardly from the other longitudinal edge 76 of the clamping plate, each boss 74 having a bore 78 therethrough, and a pair of openings or bores 80 extending through the endwall, the respective bores 78 and 80 being adapted to be brought into registry with one another. A threaded fastener 82, disposed exteriorly of the interior chamber, has a head member which engages the exterior outer surface of the endwall, and a threaded portion sized to pass through an associated respective opening 80 and threadably engage with the bore 78 formed in the boss 74.

In a preferred embodiment, the mirror mounting head 12 is provided to a user with the clamping plate 42 mounted to the end wall 24 and the mirror 30 secured by the tabs 34 to the slots 36 in the mirror head. The end portion 16 is inserted through the opening 32 and into the longitudinal socket formed by the sleeve portions 50 and 52 in juxtaposition with the ribs 56 in the mirror mounting head 12. At this point, the mirror mounting head 12 is rendered rotatable about a longitudinal axis. To ensure that the desired position is maintained, the fasteners 82, operable exteriorly of the interior chamber, would be advanced into engagement with the bosses 74 in the clamping plate, threadable engagement with the bores thereby drawing the clamping plate towards the endwall and into tight gripping engagement against the end portion.

In another preferred embodiment, referring to FIG. 6, a spherical socket in the mirror mounting head 12 cooperates to receive the ball 60 of a ball and socket mounting. In this arrangement, the endwall is provided with an opening 86, and an axial stem 88 extends from the ball for connection to the end portion 16.

The plurality of second ribs 58 are generally parallel to one another and extend upwardly from the endwall 24 to end portions which cooperate to form a substantially hemispherical support. The hemispherical support cradle formed by the ribs 58 formed around the opening 86 and the hemispherical cavity 48 formed in the clamping plate 42 cooperate to form a spherical cavity when the clamping plate is brought into juxtaposition with the ribs 58.

In use, the mirror mounting head 12 is provided to a user with the mirror 30 secured by the tabs 34 connected to the slots 36 in the mirror head, and the ball 60 captivated in the spherical socket formed between the hemispherical central portion 48 in the clamping plate and the ribs 58 extending from the endwall. At this point the stem 88 extends through the opening 86 for connection to the end portion 16 is capable of rotational movement, or swiveling, about the socket. To ensure that the mirror mounting head 12 is held fixedly in a desired position, the fasteners 82, operable exteriorly of the interior chamber 22, are advanced into engagement with the clamping plate, thereby drawing the clamping plate towards the endwall and against the ball, thereby tightening the grip on the ball 60 and preventing it from rotating.

Accordingly there is provided herein a dual mount rear view mirror assembly that includes a mirror head tightly but turnably clamped to the distal end of a pole or shaft or staff mounted onto the fender of a large truck or bus. The mirror head has disposed, within an interior chamber thereof, socket means that form either a longitudinal bore to clampingly receive the distal end of the pole and permit rotational motion of the mirror head relative to the longitudinal axis of the pole or a ball socket for seating the ball portion of a ball socket member connected to the distal end of the pole and permit rotational or swiveling motion of the mirror head relative to the longitudinal axis of the pole. Tightening means, exterior in part to the interior chamber, move from a first position wherein the mirror head may turn relative to the pole and into a second position to orient the mirror head into a desired position and fixedly clamp the mirror head in that position.

It should be noted that the present dual mount may be incorporated into other mirror housings other than one utilizing a tabbed reflective surface and the present invention is not to be construed as being limited thereto.

While the invention has been described in connection with the preferred embodiment, it is to be understood that it is not intended to limit the invention to that embodiment. On the contrary, it is intended to cover all alternatives, modifications and equivalents which may be included within the scope of the invention as defined by the appended claims.

What is claimed is:

1. In a rear view mirror assembly comprising a mirror head for mounting a mirror and attachable to the end portion of a vehicle support bracket, said mirror head having an interior surface defining an interior chamber and periphery shaped to receive said mirror, and clamping means for clamping said mirror head tightly yet turnably to said end portion, the improvement wherein said clamping means comprises:
   socket means interiorly of said interior chamber and defining a socket for receiving said end portion, said socket means comprising:
   an endwall portion of said mirror head facing inwardly of said interior chamber, said endwall portion having a first opening communicating with said socket,
   a clamping plate, said endwall portion and said clamping plate being configured to form a socket for captivating said end portion and constraining said mirror head to turn about an axis through said socket, and
   tightening means, at least in part disposed exteriorly of said interior chamber, for forcing said clamping plate and said endwall portion towards one another and against the end portion when said end portion is disposed in said socket whereby to prevent the mirror head from turning relative to the end portion;
   said tightening means being accessible while the mirror assembly is assembled.

2. The rear view mirror assembly as recited in claim 1, wherein said clamping plate comprises a resiliently rigid material.

3. The rear view mirror assembly as recited in claim 2, wherein said tightening means comprises:
   a first and second aperture being provided, respectively, in said clamping plate and said endwall portion, and
   a fastener having a head portion adapted to engage the exterior surface of said mirror head and a threaded portion sized to pass through the apertures and into said interior passage and threadably engage the wall forming said first aperture,
   and wherein threadable engagement draws the clamping plate towards the endwall portion into tight engagement with the end portion therebetween.

4. The rear view mirror assembly as recited in claim 3, wherein said tightening means comprises:
   positioning means disposed interiorly of said mounting head for positioning said clamping plate relative to said endwall portion, said positioning means including internally bored first and second bosses, respectively, on said damping plate and said endwall portion,
   a threaded fastener having a head member to engage the clamping plate and a threaded portion sized to pass through the bore in said clamping plate and threadably engage a wall forming the bore in said endwall portion, and
   wherein threadable engagement drives the clamping plate towards the endwall portion and into engagement with the end portion therebetween.

5. The rear view mirror assembly as recited in claim 1, wherein:
   said socket means comprises said clamping plate and said endwall portion each including a first sleeve portion and a second sleeve portion,
   said first sleeve portion and said second sleeve portion cooperating to combine and form axially spaced first and second sleeves sized to receive the end portion of said vehicle support bracket and define a longitudinal axis about which the mirror head rotates when the end portion is disposed in said sleeves.

6. The rear view mirror assembly as recited in claim 1, wherein:
   said end portion comprises a ball fixedly connected thereto, and
   said socket means comprises said clamping plate and said endwall portion each including a ball seat portion, said seat portions cooperating to combine and form a ball socket for receiving a ball and within which said ball can swivel and rotate thereby to change the angular position of said mirror head relative to said end portion.

7. The rear view mirror assembly as recited in claim 6, wherein:
   said end portion includes an axial stem connected to said ball, and
   said endwall includes a second opening sized to receive an end portion of said stem, said mirror head being able to rotate relative to the ball when said ball is captivated in said socket.

8. The rear view mirror assembly as recited in claim 7, wherein said socket means comprises:
   a plurality of ribs extending upwardly from said endwall portion and to respective arcuate end surfaces which cooperate to form a spherical cradle.

9. The rear view mirror assembly as recited in claim 8, wherein the ribs are generally parallel to one another.

10. The rear view mirror assembly as recited in claim 8, wherein said upstanding ribs extend proximate the opening in said endwall portion.

11. The rear view mirror assembly as recited in claim 5, wherein said first and second sleeve portions on said endwall portion comprise a plurality of ribs, said ribs extending upwardly from said endwall portion and to respective arcuate end surfaces to form a cradle for said end portion.

12. The rear view mirror assembly as recited in claim 11, wherein
said ribs are generally parallel to one another and disposed longitudinally of said arcuate end surfaces in longitudinally aligned relation, and
said mirror head has a second opening provided at a location spaced from said socket means, said second opening being generally longitudinally aligned with said first and second sleeve portions.

13. A mirror head for securement to a vehicle support bracket, said mirror head comprising:
a head wall formed as an integrally molded plastic piece and having an interior surface defining an interior chamber and a periphery shaped to receive a mirror,
mounting means for clamping said mirror head tightly yet turnably to an end portion of said support bracket, said mounting means comprising:
socket means interiorly of said interior chamber and defining a socket for receiving said end portion, said socket means comprising:
an endwall facing inwardly of said interior chamber, said endwall having an opening communicating with said socket,
a clamping plate, said endwall and said clamping plate being configured to form a socket for captivating said end portion and constraining said mirror head to turn about an axis through said socket, and
tightening means, disposed at least in part exteriorly of said interior chamber, for forcing said clamping plate and said endwall towards one another and against the end portion when said end portion is disposed in said socket to thereby prevent the mirror head turning relative to the end portion;
said tightening means being actuated from outside said mirror head and said interior chamber.

14. The rear view mirror assembly as recited in claim 13, further comprising:
connecting means for removably mounting said mirror to the mirror head, said connecting means comprising a plurality of engagement openings being formed in the outer periphery remote to said endwall portion for receiving locking fingers extending from said mirror, said connection substantially sealing the interior chamber of said mirror head.

15. A dual mounting member for mounting a mirror head to a mirror shaft, comprising:
a clamping plate having a central substantially semispherical portion, a pair of opposed sleeve portions extending outwardly from the hemispherical portion,
a ribbed endwall mating with the clamping plate and having a plurality of spaced apart discontinuous ribs, the discontinuity forming a hemispherical portion complimentary to the hemispherical portion of the champing plate, the endwall having a pair of opposed sleeve portions extending from the hemispherical portion, and
wherein when the clamping plate and endwall are mated the hemispherical portions cooperate to define a ball receiving socket adapted to receive a ball mount and the sleeves and the socket cooperate to define a shaft receiving passageway adapted to receive an elongated shaft;
wherein said dual mounting member can mount a mirror head to a shaft with said shaft either having a ball mount or having an elongated shaft.

16. In a rear view mirror assembly comprising a mirror head for mounting a mirror and attachable to the end portion or ball mount of a vehicle support bracket, said mirror head having an interior surface defining an interior chamber and a periphery shaped to receive said mirror, and clamping means for clamping said mirror head tightly yet turnably to said end portion or ball mount, the improvement wherein said clamping means comprises:
socket means interiorly of said interior chamber and defining a socket for receiving said end portion, but capable of receiving said ball mount, said socket means comprising:
an endwall portion of said mirror head facing inwardly of said interior chamber, said endwall portion having a first opening communicating with said socket,
a clamping plate, said endwall portion and said clamping plate being configured to form a socket for captivating one of either said end portion and said ball mount, said socket having both a cylindrical section and a spherical section, and
tightening means, at least in part disposed exteriorly of said interior chamber, for forcing said clamping plate and said endwall portion towards one another and against the end portion or ball mount when said end portion or ball mount is disposed in said socket whereby to prevent the mirror head from turning relative to the end portion or ball mount;
said tightening means being actuated from outside said mirror head and said interior chamber.

17. A rear view mirror assembly comprising a mirror head for mounting a mirror and attachable to the ball mount of a vehicle support bracket, said mirror head having en interior surface defining an interior chamber and a periphery shaped to receive said mirror, and clamping means for clamping said mirror head tightly yet turnably to said ball mount, the improvement wherein said clamping means comprises:
socket means interiorly of said interior chamber and defining a socket for receiving said ball mount, said socket means comprising:
an endwall portion of said mirror head facing inwardly of said interior chamber, said endwall portion having a first opening communicating with said socket,
a clamping plate, said endwall portion and said clamping plate being configured to form a socket for captivating said ball mount and constraining said mirror head to turn about said ball mount, and
tightening means, at least in part disposed exteriorly of said interior chamber, for forcing said clamping plate and said endwall portion towards one another and against said ball mount when said ball mount is disposed in said socket whereby to prevent the mirror head from turning relative to the ball mount;
said tightening means being accessible while the mirror assembly is assembled.

18. The rear view mirror assembly as recited in claim 17, wherein said clamping plate comprises a resiliently rigid material.

19. The rear view mirror assembly as recited in claim 18, wherein said tightening means comprises:
a first and second aperture being provided, respectively, in said clamping plate and said endwall portion, and a fastener having a head portion adapted to engage the exterior surface of said mirror head and a threaded portion sized to pass through the apertures and into said interior passage and threadably engage the wall forming said first aperture, and wherein threadable engagement draws the clamping plate towards the endwall portion into tight engagement with the ball mount therebetween.

20. The rear view mirror assembly as recited in claim 19, wherein said tightening means comprises:

positioning means disposed interiorly of said mounting head for positioning said clamping plate relative to said endwall portion, said positioning means including internally bored first and second bosses, respectively, on said clamping plate and said endwall portion, a threaded fastener having a head member to engage the clamping plate and a threaded portion sized to pass through the bore in said clamping plate and threadably engage a wall forming the bore in said endwall portion, and wherein threadable engagement drives the clamping plate towards the endwall portion and into engagement with the ball mount therebetween.

* * * * *